United States Patent
Doi et al.

(10) Patent No.: US 8,467,635 B2
(45) Date of Patent: Jun. 18, 2013

(54) OPTICAL MODULATOR

(75) Inventors: Yoshiyuki Doi, Atsugi (JP); Takashi Yamada, Atsugi (JP); Yohei Sakamaki, Atsugi (JP); Akimasa Kaneko, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 148 days.

(21) Appl. No.: 13/129,680

(22) PCT Filed: Dec. 2, 2009

(86) PCT No.: PCT/JP2009/006524
§ 371 (c)(1),
(2), (4) Date: May 17, 2011

(87) PCT Pub. No.: WO2010/064417
PCT Pub. Date: Jun. 10, 2010

(65) Prior Publication Data
US 2011/0229070 A1    Sep. 22, 2011

(30) Foreign Application Priority Data
Dec. 2, 2008  (JP) .................................. 2008-307787

(51) Int. Cl.
G02F 1/035   (2006.01)
G02F 1/225   (2006.01)

(52) U.S. Cl.
USPC .................................................. 385/2; 385/3

(58) Field of Classification Search
None
See application file for complete search history.

(56) References Cited

U.S. PATENT DOCUMENTS 4,071,751 A * 1/1978 Waksberg .................. 250/201.1
5,724,169 A * 3/1998 LaGasse ....................... 398/141
5,729,642 A * 3/1998 Thaniyavarn .................. 385/17
(Continued)

FOREIGN PATENT DOCUMENTS
JP   04-029113    1/1992
JP   2001-154164  8/2001
(Continued)

OTHER PUBLICATIONS

H. Yamazaki et al. Advanced optical modulators with hybrid configuration of silica-based PLC and LiNbO3 phase-shifter array for ultra-high-speed transport networks. Innovations in NGN: Future Network and Services, 2008. K-INGN 2008. First ITU-T Kaleidoscope Academic Conference, pp. 237-244, May 12-13, 2008.*

(Continued)

Primary Examiner — Mike Stahl
(74) Attorney, Agent, or Firm — Workman Nydegger

(57) ABSTRACT

An optical modulator having a high stability is provided. In the optical modulator according to the present invention, a phase modulation by an electro-optic effect is made on an optical substrate of an electro-optic material while the setting of an operating point by a thermal-optic effect is made on a planar lightwave circuit (PLC) substrate of quartz, silicon, or the like. Such configuration can suppress the influence of thermal drift or the like because no heat is applied directly to the optical substrate of the electro-optic material. In addition, breakage and warpage of the substrate due to heat are also mitigated. Further, quartz used for the PLC has a low thermal conductivity, approximately one-fifth of that of the LN substrate (approximately 1 W/(m·K)), and therefore, a desired phase difference can be maintained with a low power consumption, and thus, the operating point becomes stabilized.

12 Claims, 5 Drawing Sheets

U.S. PATENT DOCUMENTS

| | | | |
|---|---|---|---|
| 6,069,729 A * | 5/2000 | Gill et al. | 359/245 |
| 6,181,456 B1 * | 1/2001 | McBrien et al. | 359/245 |
| 6,222,965 B1 * | 4/2001 | Smith | 385/40 |
| 6,400,490 B1 | 6/2002 | Hosoi | |
| 6,876,782 B2 * | 4/2005 | Kambe et al. | 385/3 |
| 7,447,395 B2 * | 11/2008 | Montgomery et al. | 385/14 |
| 2004/0223677 A1 * | 11/2004 | Park et al. | 385/1 |
| 2012/0106888 A1 * | 5/2012 | Goh et al. | 385/3 |

FOREIGN PATENT DOCUMENTS

| | | |
|---|---|---|
| JP | 2003-043428 | 2/2003 |
| JP | 2003-121806 | 4/2003 |
| JP | 2003-149614 A * | 5/2003 |

OTHER PUBLICATIONS

T. Yamada et al. 86-Gbit/s differential quadrature phase-shift-keying modulator using hybrid assembly technique with planar lightwave circuit and LiNbO3 devices. Lasers and Electro-Optics Society, 2006 (LEOS 2006, ThDD4), pp. 963-964, Oct. 2006.*

T. Yamada et al. Compact 111-Gbit/s integrated RZ-DQPSK modulator using hybrid assembly technique with silica-based PLCs and LiNbO3 devices. Optical Fiber Communication/National Fiber Optic Engineers Conference, 2008 (OFC/NFOEC 2008, OThC3), pp. 1-3, Feb. 24-28, 2008.*

Y. Yamada et al. An application of a silica-on-terraced-silicon platform to hybrid Mach-Zehnder interferometric circuits consisting of silica-waveguides and LiNbO3 phase-shifters. IEEE Photonics Technology Letters, 6:7:822-824, Jul. 1994.*

NTT Photonics Laboratories. 100-Gbit/S DQPSK modulator using PLC-LN hybrid integration. H-CT-3, retrieved from www.ntt.co.jp/RD/OFIS/active/2007pdfe/pdf/h_ct03_e.pdf, dated 2007.*

PCT/JP2009/006524, mailed Jan. 26, 2010, International Search Report.

PCT/JP2009/006524, mailed Jun. 16, 2011, International Preliminary Report.

* cited by examiner

OPTICAL MODULATOR

TECHNICAL FIELD

The present invention relates to an optical modulator. More specifically, the present invention relates to a Mach-Zehnder optical modulator.

BACKGROUND ART with the advancement of the optical communication technology, high-speed and high-stability optical modulators have been required. As a high-speed optical modulator, a Mach-Zehnder optical modulator has been known. The Mach-Zehnder optical modulator splits an input light and combines the split light with a phase difference added thereto to obtain an output light of which intensity is modulated.

FIG. 1 shows a conventional Mach-Zehnder optical modulator. The Mach-Zehnder optical modulator 100 comprises, on an optical substrate (of a lithium niobate crystal (LN: $LiNbO_3$) or the like) 110 having an electro-optic effect, an input waveguide 112 for inputting an input light, a Y branching portion 114 for splitting the light from the input waveguide, two arm waveguides 116a, 116b for respectively guiding the split light, a Y combining portion 118 for combining the light from the two arm waveguides, and an output waveguide 120 for outputting the combined light. These waveguides can be formed by selectively diffusing a metal, such as Ti, into the optical substrate. Thereafter, a buffer layer of $SiO_2$ or the like is provided on the entire surface of the substrate, and metal electrodes 122a, 122b of Au or the like are formed on the respective arm waveguides.

The electrodes 122a, 122b are connected to a bias circuit 124 for setting an operating point of the optical modulator and a high-frequency signal source 128 for modulating the optical modulator, and between these electrodes, a terminal resistor 129 is connected. In addition, the bias circuit 124 is connected to a power supply 126 for supplying a DC voltage.

The input light made incident into the input waveguide 112 is split into two at the Y branching portion 114. While propagating through the arm waveguides 116a, 116b, the split light come under the influence of an electro-optic effect caused by a modulating signal applied to the electrodes 122a, 122b and change its phases. In short, the phase difference between the arm waveguides can be changed by the signals applied to the electrodes. When the light from the arm waveguides 116a, 116b are combined at the Y combining portion, light of which intensity is modulated depending on the phase difference between these two light is launched from the output waveguide 120.

FIG. 2 shows the relation between the phase difference of the light and the intensity of the output light. When the voltage applied to the electrodes is zero, no phase change due to the electro-optic effect occurs in the arm waveguides. Accordingly, if the arm waveguides are equal in length, the phase difference becomes zero. In this case, the intensity of the output light having two light from the arm waveguides combined becomes the maximum. By increasing the voltage applied to the electrodes, the phase difference becomes increased. When the phase difference is n, the two light from the arm waveguides are canceled, and the intensity of the output light becomes the minimum.

In practice, in order to maximize the extinction ratio of the output light, the operating point of the optical modulator is set at a middle voltage between the voltage maximizing the intensity of the output light and the voltage minimizing the intensity, and the modulating signal is applied to this operating point (PTL 1). The operating point may be set by applying a DC bias (from the bias circuit 124 in FIG. 1) between the electrodes in addition to the modulating signal (from the high-frequency signal source 128 in FIG. 1). Alternatively, as shown in FIG. 3, heaters 342a and 342b may be provided on the arm waveguides in addition to the phase modulating electrodes 322a and 322b. When the waveguides are heated by the current sources 344a and 344b with the heaters 342a and 342b, a phase difference between the arm waveguides because of a thermo-optic effect is caused, which can set the operating point (PTL 2). In this case, between the phase modulating electrodes 322a and 322b, the modulating signal may be applied directly from the high-frequency signal source 328 without applying the DC bias.

However, the conventional method of setting the operating point of a Mach-Zehnder optical modulator has problems described below. First, in the method of setting the operating point with a DC bias, if the DC bias is applied for a long period of time, the operating point changes with time (DC drift phenomenon), resulting in a problem of degrading the modulation characteristic. Therefore, it is necessary to monitor the output light of the optical modulator and to provide feedback so as to adjust the voltage of the DC bias. In addition, considering 20-year of use, as an adjusting range of the DC bias, a voltage source having a wide variable range of approximately ±15 V or more is required.

In the method of setting the operating point with heaters provided on the arm waveguides, if an optical substrate of a ferroelectric, such as LN, is heated, an electric field is generated in the substrate by polarization depending on the temperature. This electric field causes an unnecessary phase change (thermal drift) in the waveguides, resulting in a problem of fluctuating the operating point. Moreover, if the ferroelectric substrate is heated, deformation in the substrate is caused with heat, and the operating point is destabilized with the piezoelectric effect. In the worse case, the substrate may be broken by static electricity charged on the surface of the substrate. Furthermore, the substrate may be broken by thermal expansion. In particular, in order to improve high frequency characteristic, it is necessary to reduce a thickness of the substrate (to a thickness of approximately 0.25 mm), which is more likely to cause such breakage. Even if the substrate does not break, warpage may occur in the substrate, which causes displacement with optical fibers at the input and output portions of the substrate, resulting in degradation in insertion loss and increase in return loss. On the other hand, in order to maintain a desired phase difference, a certain temperature gradient continues to be provided between the waveguides. However, the LN substrate is a crystal and thus has a relatively high thermal conductivity (approximately 5 W/(m·K)), which causes heat to diffuse over the entire substrate, and the temperature of the substrate tends to be equalized. Therefore, there are problems in that it is difficult to stabilize the operating point and that power consumption becomes high.

The present invention has been made in view of such problems, and has an object to provide an optical modulator having a high stability.

CITATION LIST

Patent Literatures

PTL 1: Japanese Patent Laid-Open No. 2001-154164
PTL 2: Japanese Patent Laid-Open No. H04-029113(1992)

SUMMARY OF INVENTION

In order to achieve such object, a Mach-Zehnder optical modulator of an optical waveguide type according to one aspect of the present invention is characterized by comprising: a heater provided on at least one of arm waveguides made of a non-electro-optic material; and electrodes provided on arm waveguides made of an electro-optic material having an electro-optic effect, the arm waveguides being optically connected to the arm waveguides, wherein the heater is configured to set an operating point of the modulator by adjusting a phase of at least one of the arm waveguides, and the electrodes are configured to apply a modulating signal for the modulator.

Yet, the optical modulator according to one aspect of the present invention is characterized in that a substrate of the non-electro-optic material is a quartz-based substrate.

Yet, the optical modulator according to one aspect of the present invention is characterized by comprising: a first substrate of the non-electro-optic material having a branching portion of the optical modulator formed therein; and a second substrate of the non-electro-optic material having a combining portion of the optical modulator formed therein, wherein the heater is formed on at least one of the first and second substrates.

Yet, the optical modulator according to one aspect of the present invention is characterized by comprising more than one Mach-Zehnder interferometers.

Yet, the optical modulator according to one aspect of the present invention is characterized in that a substrate of the non-electro-optic material and a substrate of the electro-optic material are joined with an adhesive agent having a lower thermal conductivity than that of the substrate of the electro-optic material.

Yet, the optical modulator according to one aspect of the present invention is characterized in that a substrate of the non-electro-optic material and a substrate of the electro-optic material are joined by using a reinforcing plate having a lower thermal conductivity than that of the substrate of the electro-optic material.

Yet, the optical modulator according to one aspect of the present invention is characterized in that only a substrate of the electro-optic material is fixed to a base.

Yet, the optical modulator according to one aspect of the present invention is characterized in that a heat sink is provided to a substrate of the non-electro-optic material on which the heater is formed.

DESCRIPTION OF EMBODIMENTS

In an optical modulator according to the present invention, phase modulation by an electro-optic effect is performed on an optical substrate of an electro-optic material, such as LN, while setting of an operating point by a thermo-optic effect is performed on a planar lightwave circuit (PLC) substrate, such as quartz or silicon. With such configuration, influence of thermal drift or the like can be suppressed because no heat is applied directly to the optical substrate of the electro-optic material. In addition, breakage and warpage of the substrate due to heat are also mitigated. Further, quartz used for the PLC has a low thermal conductivity, approximately one-fifth of that of the LN substrate (approximately 1 W/(m·K)), and therefore, a desired phase difference can be maintained with a lower power consumption, facilitating a stabilization of the operating point. Moreover, quartz exhibits less pyroelectric effect and piezoelectric effect even when thermally expanded. Hereinafter, embodiments of the present invention will be described in detail with reference to the drawings.

First Embodiment

Figure 1:
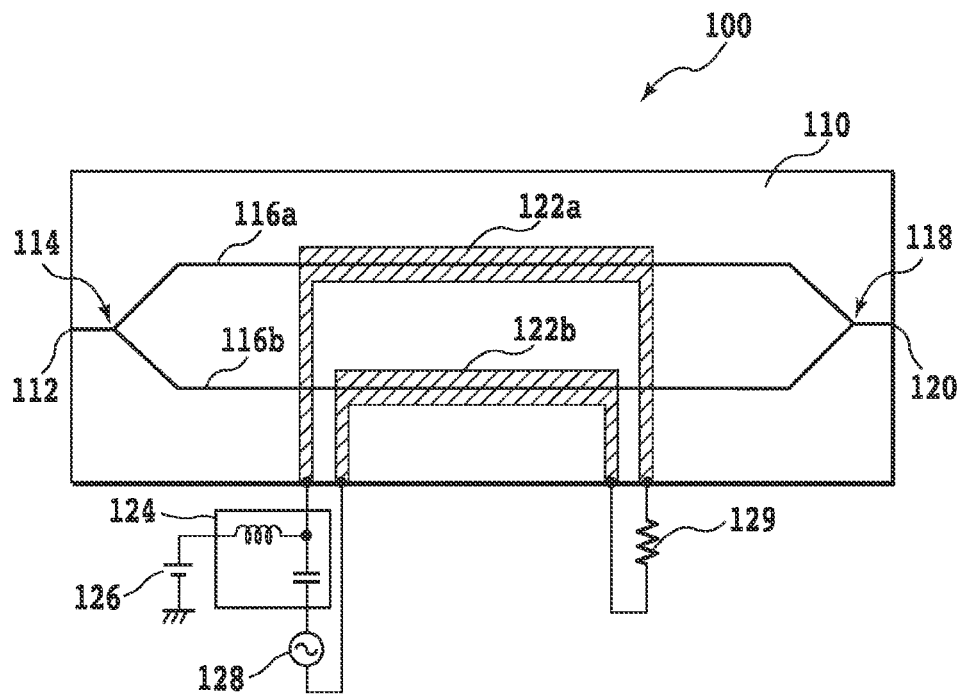
FIG. 1 is a diagram showing a configuration example of a Mach-Zehnder optical modulator.
Figure 2:
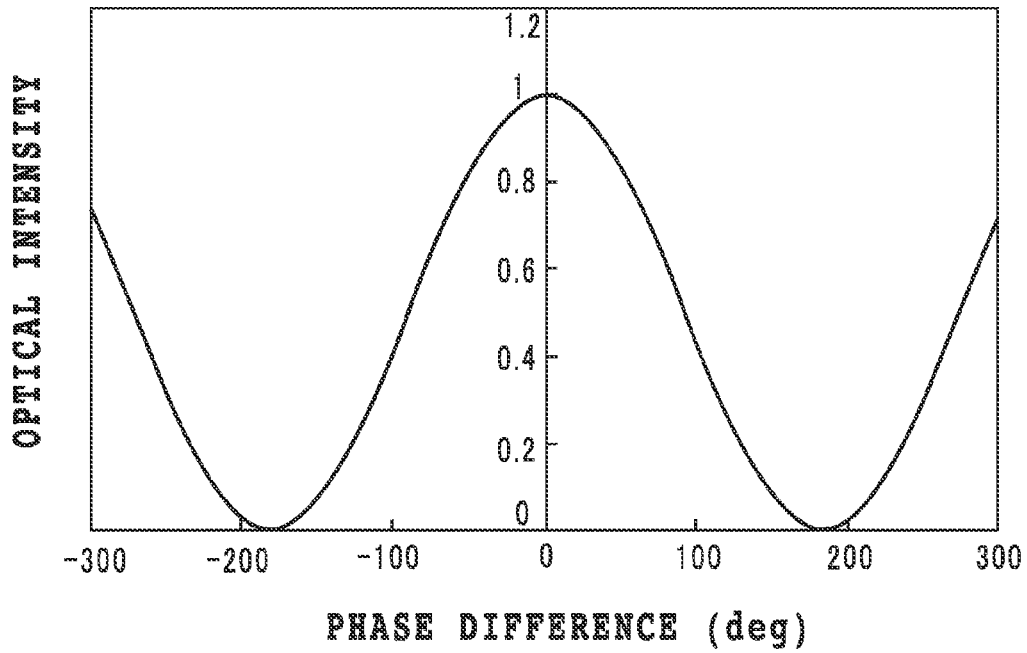
FIG. 2 is a graph showing a relation between a phase difference of light beams and an intensity of an output light of the Mach-Zehnder optical modulator.
Figure 3:
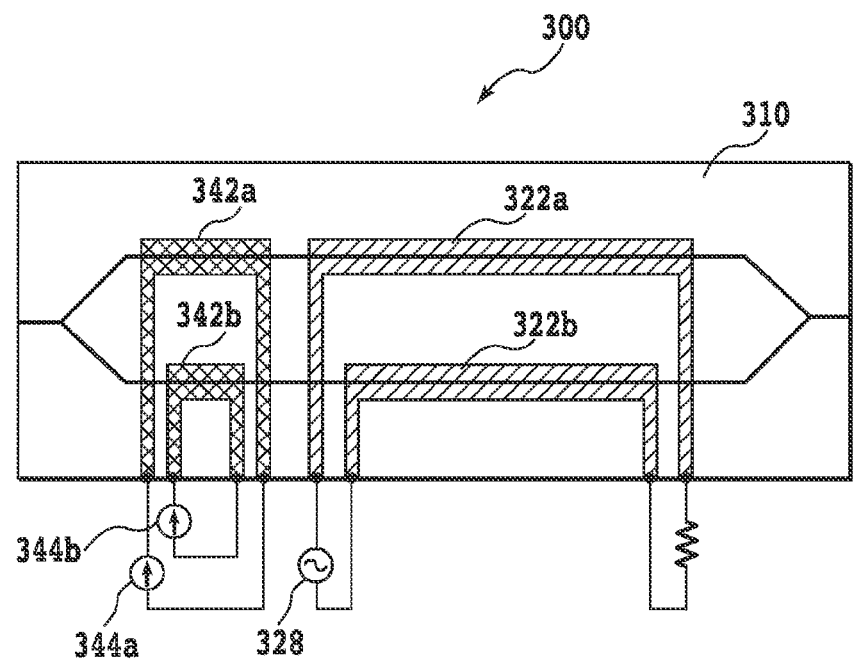
FIG. 3 is a diagram showing a configuration example of a Mach-Zehnder optical modulator comprising heaters for setting an operating point of the modulator.
Figure 4:
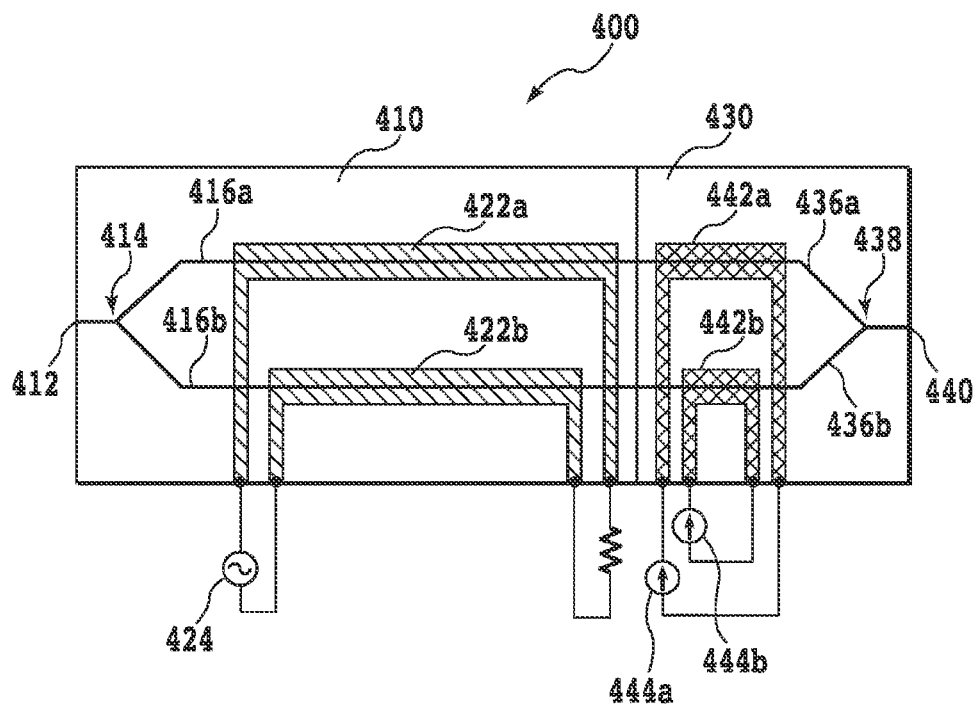
FIG. 4 is a diagram showing a configuration example of a Mach-Zehnder optical modulator according to a first embodiment of the present invention.

FIG. 4 shows an optical modulator according to a first embodiment of the present invention. The Mach-Zehnder optical modulator 400 is composed of an LN substrate 410 of an electro-optic material and a quartz-based substrate 430 of a non-electro-optic material. Formed on the LN substrate 410 is an input waveguide 412 for inputting an input light, a Y branching portion 414 for splitting the light from the input waveguide, and two arm waveguides 416a, 416b for respectively guiding the split light. On the arm waveguides, modulating electrodes 422a, 422b are provided, to which a high-frequency signal source 424 for modulation is connected. Formed on the quartz substrate 430 is two arm waveguides 436a, 436b for optically coupling respectively to the two arm waveguides 416a, 416b on the LN substrate, a Y combining portion 438 for combining light from these two arm waveguides, and an output waveguide 440 for outputting the combined light. On the respective arm waveguides, heaters 442a and 442b for heating are provided. For the heaters, a tantalum nitride ($Ta_2N$) thin film is used, of which the resistance is set at 500 Ω. Note that nichrome (NiCr) or tungsten (W) may be used for the heaters. In addition, the heater may be provided on any one of the arm waveguides, i.e., not both.

An input light made incident into the input waveguide 412 on the LN substrate 410 is split into two at the Y branching portion 414. While propagating through the arm waveguides 416a, 416b on the LN substrate, the split light come under the influence of an electro-optic effect by a modulating signal applied to the electrodes 422a, 422b, and the phases are modulated. The light from the arm waveguides on the LN substrate are then coupled to the arm waveguides 436a, 436b on the quartz substrate 430, where the light come under the influence of a thermo-optic effect by heating with the heaters 442a and 442b, and a predetermined phase difference is given between the arm waveguides. The light thus phase-modulated and given with the predetermined phase difference are combined at the Y combining portion 438, and is outputted as a modulated light from the output waveguide 440 on the quartz substrate.

In the optical modulator 400 according to the present invention, a modulating signal can be applied directly to the electrodes 422a, 422b on the LN substrate 410 without applying any DC bias. Therefore, the DC drift does not occur or can be suppressed to an extremely low value. The operating point, aside from this, can be set independently by current sources 444a, 444b with the heaters 442a and 442b on the quartz substrate 430. In this case, the heaters are controlled by the current sources 444a, 444b so as to cause a certain temperature gradient between the arm waveguides on the quartz substrate depending on a desired phase difference. According to need, feedback control may be made on the current values of the heaters by monitoring the output light from the output waveguide 440.

Since the quartz substrate has a low thermal conductivity, a thermal diffusion to the adjacent LN substrate is low, and a problem of a thermal drift or the like by the LN substrate being heated, is less likely to occur. In order to further reduce the thermal diffusion from the quartz substrate to the LN substrate, an adhesive agent having a high heat insulating property (a low thermal conductivity) may be used for a joint of the LN substrate and the quartz substrate. Examples of such adhesive agent include an acryl-based, a silicone-based, or an epoxy-based adhesive agent.

Figure 5:
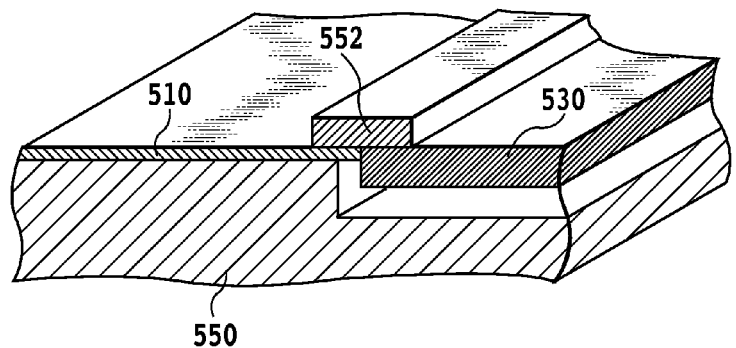
FIG. 5 is a diagram showing a configuration example in which a reinforcing plate having a high heat insulating property is used for a joint of a substrate constituting a Mach-Zehnder optical modulator and a quartz substrate.

Further, as shown in FIG. 5, a reinforcing plate 552 having a high heat insulating property (a low thermal conductivity) may be used for the joint of the LN substrate 510 and the quartz substrate 530, such that the quartz substrate is not in contact with a base 550 supporting the LN substrate. This can further reduce the thermal diffusion from the quartz substrate 530 to the LN substrate 510. If the thermal diffusion to the LN substrate is reduced, the influence (thermal drift and the like) caused by the LN substrate being heated becomes low. Moreover, even if the quartz substrate is expanded due to the heating with the heaters, it will not cause deformation of the chip of the LN substrate, hence, there is no influence of the piezoelectric effect due to the deformation, and the breakage, warpage, or the like of the LN substrate can be prevented as well. Note that the thickness of the quartz substrate is approximately 1 mm, which is greater than the thickness of the LN substrate (approximately 0.25 mm), and breakage and warpage due to thermal expansion is less likely to occur.

Figure 6:
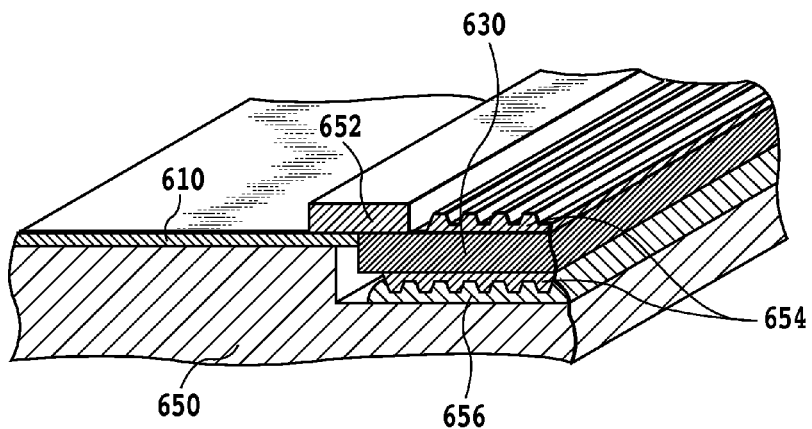
FIG. 6 is a diagram showing a configuration example in which a reinforcing plate having a high heat insulating property is used for a joint of a substrate constituting a Mach-Zehnder optical modulator and a quartz substrate, and the quartz substrate is provided with a heat sink and is bonded to a base supporting an LN substrate with an adhesive agent having a high thermal conductivity.

Further, as shown in FIG. 6, a reinforcing plate 652 having a high heat insulating property may be used for the joint of the LN substrate 610 and the quartz substrate 630, so as to let heat out to a region other than the LN substrate by providing the heat sink 654 to the quartz substrate. In this case, as shown in the figure, the heat sink 654 may be provided on the back surface of the quartz substrate, such that this heat sink is bonded to a base 650 supporting the LN substrate with an adhesive agent 656 having a high thermal conductivity. For example, as the adhesive agent having a high thermal conductivity, an electrically conductive adhesive agent containing a metal (Ag or the like) in a polymer such as an epoxy polymer may be used. Moreover, in place of the heat sink, the heat may be absorbed by a Peltier element. Since, with this configuration, heat is not accumulated in the quartz substrate 630, the temperature gradient between the waveguides on the quartz substrate is easily secured, and the operating point is stabilized. Furthermore, since the thermal diffusion to the LN substrate is reduced, the thermal drift is reduced.

Second Embodiment

Figure 7:
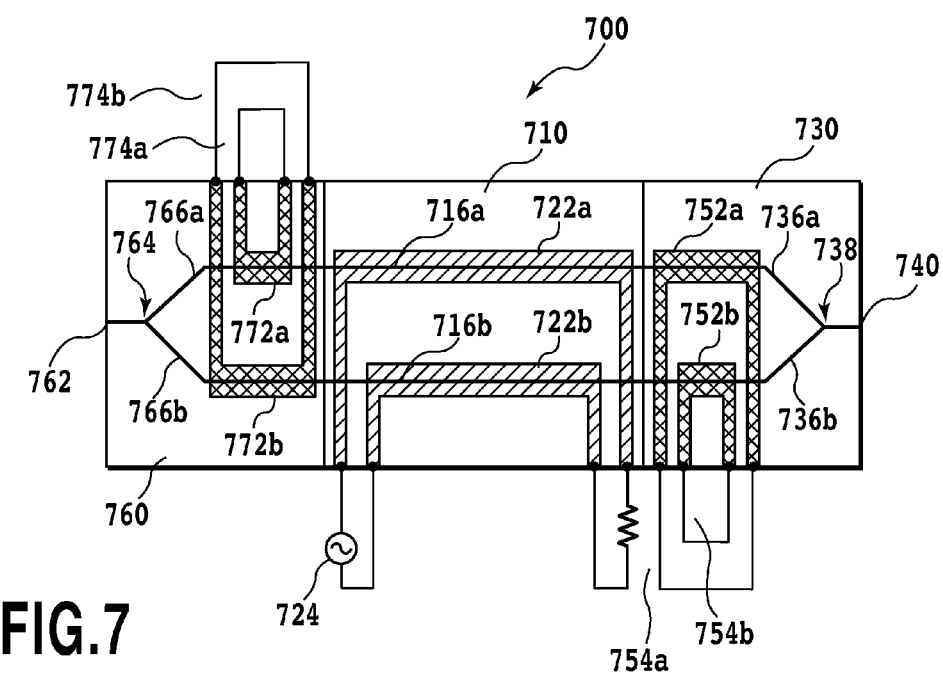
FIG. 7 is a diagram showing a configuration example of a Mach-Zehnder optical modulator according to a second embodiment of the present invention.

FIG. 7 shows an optical modulator according to a second embodiment of the present invention. The Mach-Zehnder optical modulator 700 is composed of a LN substrate 710 of an electro-optic material, and two quartz-based substrates 730, 760. Formed on the former quartz substrate 760 is a input waveguide 762 for inputting an input light, a Y branching portion 764 for splitting the light from the input waveguide and two arm waveguides 766a, 766b for respectively guiding two split light. On the LN substrate 710, two arm waveguides 716a, 716b are formed, which are optically coupled to the two arm waveguides 766a, 766b on the former quartz substrate. On the arm waveguides on the LN substrate, modulating electrodes 722a, 722b are provided. Formed on the latter quartz substrate 730 is two arm waveguides 736a, 736b for optically coupling to the two arm waveguides 716a, 716b on the LN substrate, a Y combining portion 738 for combining the light from the two arm waveguides, and an output waveguide 740 for outputting the combined light.

Heaters 752a, 752b, 772a, 772b for heating may be provided on any one of or both of the former and latter quartz substrates. In addition, the heaters may be provided on any one of the arm waveguides but not both. This increases the degree of freedom in design. For example, the phase difference required for the setting of the operating point may be distributed to the former and latter quartz substrates. This enables a thermally optimum design and can achieve a further reduction in power consumption and further stabilization of the operating point.

Moreover, such configuration enables the former and latter quartz substrates to be fabricated of the same material in the same process. Accordingly, variation can be suppressed, stabilizing the splitting/combining characteristics of the branching portion and the combining portion. In particular, as shown in FIG. 8, in an optical modulator using a plurality of Mach-Zehnder interferometers, not only the stabilization of splitting/combining characteristics but also improvement in yield and increase in the density of integration can be expected.

Third Embodiment

Figure 8:
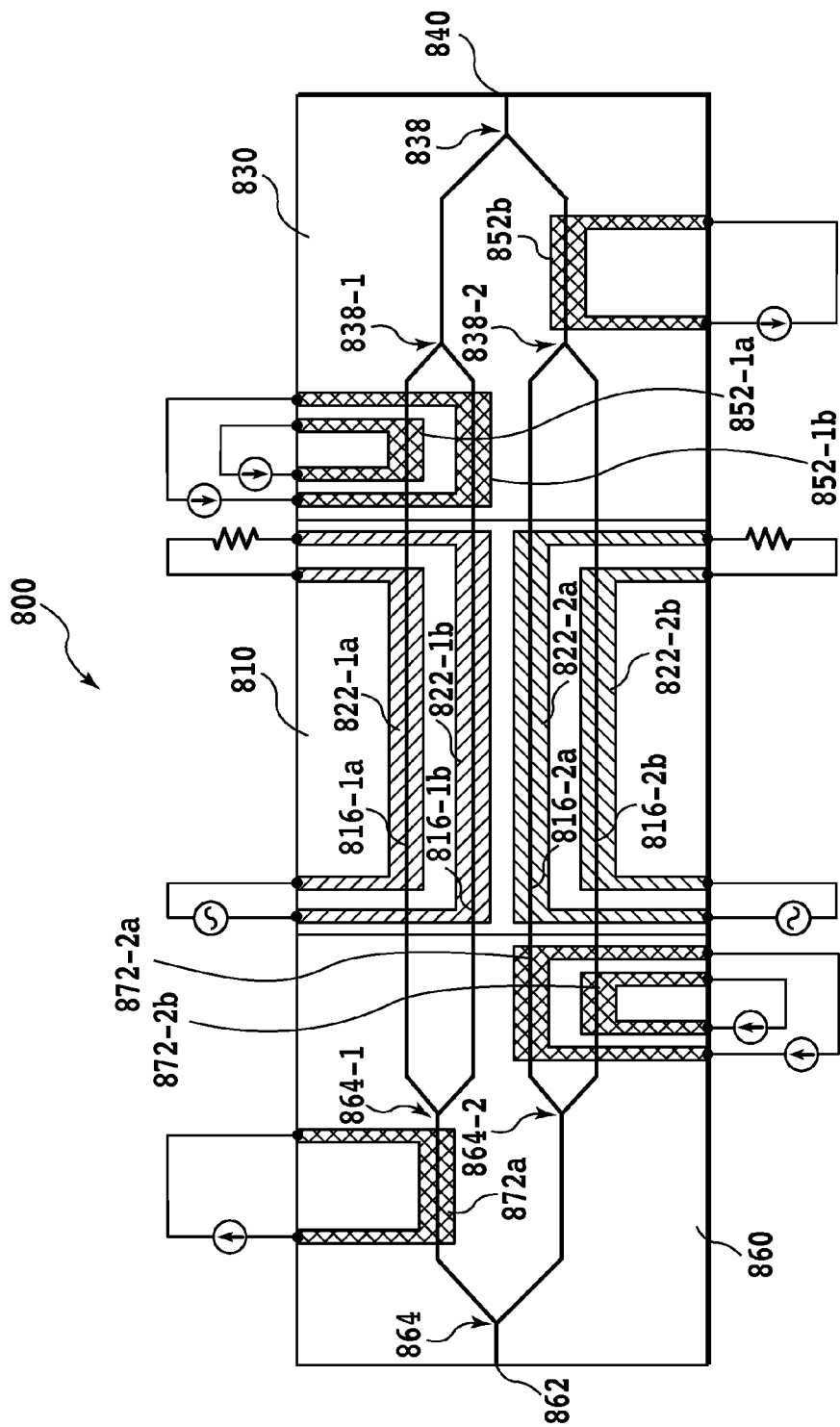
FIG. 8 is a diagram showing a configuration example of a Mach-Zehnder optical modulator according to a third embodiment of the present invention.

FIG. 8 shows an optical modulator according to a third embodiment of the present invention. The Mach-Zehnder optical modulator 800 is composed of an LN substrate 810 of an electro-optic material and two quartz-based substrates 830, 860, in which three Mach-Zehnder interferometers are configured in a complex manner. Formed on the former quartz substrate 860 is an input waveguide 862 for inputting an input light, a Y branching portion 864 for splitting the light from the input waveguide, and Y branching portions 864-1, 864-2 for further splitting the split light. On the LN substrate 810, four arm waveguides 816-1a, 816-1b, 816-2a, 816-2b are formed. On the former quartz substrate, the four arm waveguides 816-1a, 816-1b, 816-2a, 816-2b are formed, which are optically coupled to four arm waveguides for guiding light from the Y branching portions 864-1, 864-2. On these arm waveguides, modulating electrodes 822-1a, 822-1b, 822-2a, 822-2b are provided. Formed on the latter quartz substrate 830 is a Y combining portion 838-1 for optically coupling to the two arm waveguides 816-1a, 816-1b on the LN substrate, a Y combining portion 838-2 for optically coupling to the two arm waveguides 816-2a, 816-2b on the LN substrate, a Y combining portion 838 for further combining the light from the above two combining portions, and an output waveguide 840 for outputting the combined light.

Heaters 852b, 852-1a, 852-1b, 872a, 872-2a, 872-2b for heating may be provided on any one of or both of the former and latter quartz substrates. In addition, the heater may be provided on any one of the arm waveguides but not both. This increases the degree of freedom in design. For example, the phase difference required for the setting of the operating point may be distributed to the former and latter quartz substrates. This enables a thermally optimum design and can achieve a further reduction in power consumption and further stabilization of the operating point.

Fourth Embodiment

Figure 9:
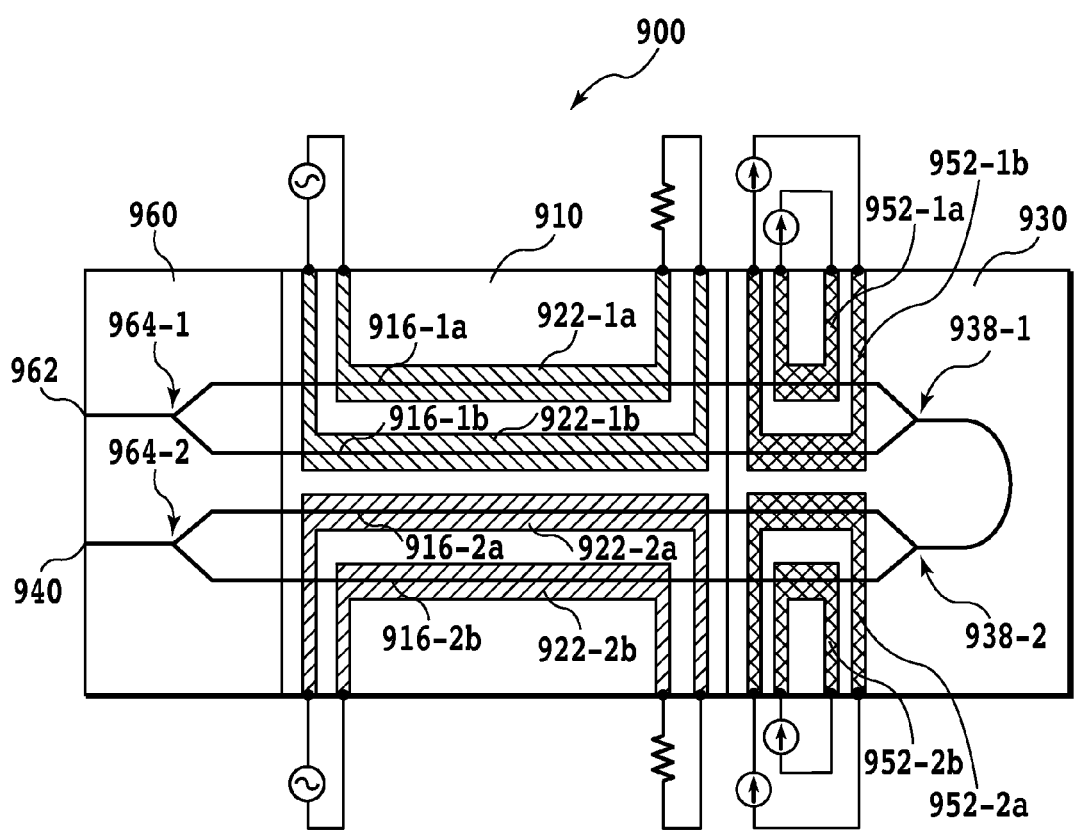
FIG. 9 is a diagram showing a configuration example of a Mach-Zehnder optical modulator according to a fourth embodiment of the present invention.

FIG. 9 shows an optical modulator according to a fourth embodiment of the present invention. The Mach-Zehnder optical modulator 900 is composed of an LN substrate 910 of an electro-optic material and two quartz-based substrates 930, 960, in which two Mach-Zehnder interferometers are configured in a folding back manner. This configuration enables cascade connection of LN modulators.

Formed on one of the quartz substrates 960 is an input waveguide 962 for inputting an input light, a Y branching portion 964-1 for splitting the light from the input waveguide, an output waveguide 940 for outputting a light from a Y combining portion 964-2. Formed on the LN substrate 910 is two arm waveguides 916-1a, 916-1b which are optically coupled to two arm waveguides for guiding the light from the Y branching portion 964-1 on the quartz substrate 960 and two arm waveguides 916-2a, 916-2b which are optically coupled respectively to two waveguides configured to guide light to the Y combining portion 964-2 on the quartz substrate 960. On these arm waveguides, modulating electrodes 922-1a, 922-1b, 922-2a, 922-2b are provided respectively. Formed on the other quartz substrate 930 is a Y combining portion 938-1 which is optically coupled to the two arm waveguides 916-1a, 916-1b on the LN substrate and a Y branching portion 938-2 which splits the light from the Y combining portion 938-1 and is optically coupled to the two arm waveguides 916-2a, 916-2b on the LN substrate.

Heaters 952-1a, 952-1b, 952-2a, 952-2b for heating may be provided on any one of or both of the two quartz substrates. In addition, the heater may be provided on any one of the arm waveguides but not both. This increases the degree of freedom in design. For example, the phase difference required for the setting of the operating point may be distributed to the former and latter quartz substrates. This configuration enables a thermally optimum design and can achieve a further reduction in power consumption and further stabilization of the operating point. Note that, when the heaters are provided on only one of the quartz substrates as illustrated in FIG. 9, the optical circuit on the other quartz substrate may be provided on the LN substrate.

Although several embodiments of the present invention have been described in details, in view of a number of embodiments to which the principles of the present invention can be applied, the embodiments described herein are merely illustrative, and should not limit the scope of the present invention. For example, although the above embodiments have been described with the LN substrate taken as an example of a substrate of an electro-optic material, in the principles of the present invention, lithium tantalate (LiTaO$_3$), KTN (KTa$_{1-x}$Nb$_x$O$_3$), KTP (KTiOPO$_4$), PZT (PbZr$_x$Ti$_{1-x}$O$_3$, lead zirconate titanate), or the like may be used. Moreover, in the above embodiments, in place of the Y branch, a circuit, such as a directional coupler, a multi-mode interference (MMI) coupler, or the like, may be used. The embodiments illustrated herein may be modified in its configurations and details without departing from the gist of the present invention. Furthermore, the elements and procedures for explanation may be modified, supplemented, or changed in order, without departing from the gist of the present invention.

REFERENCE SIGNS LIST 100, 300, 400, 700, 800, 900 Mach-Zehnder optical modulator
110, 310, 410, 510, 610, 710, 810, 910 optical substrate
112, 412, 762, 862, 962 input waveguide
114, 414, 764, 864, 864-1, 864-2, 964-1, 938-2 Y branching portion
116a, 116b, 416a, 416b, 436a, 436b, 716a, 716b, 736a, 736b, 766a, 766b, 816-1a, 816-1b, 816-2a, 816-2b, 916-1a, 916-1b, 916-2a, 916-2b arm waveguide
118, 438, 738, 838, 838-1, 838-2, 938-1, 964-2 Y combining portion
120, 440, 740, 840, 940 output waveguide
122a, 122b, 322a, 322b, 422a, 422b, 722a, 722b, 822-1a, 822-1b, 822-2a, 822-2b, 916-1a, 916-1b, 916-2a, 916-2b electrode
124 bias circuit
126 power supply
128, 328, 424, 724 high-frequency signal source
129 terminal resistor
342a, 342b, 442a, 442b, 772a, 772b, 752a, 752b, 852a, 852-1a, 852-1b, 872a, 872-2a, 872-2b, 952-1a, 952-1b, 952-2a, 952-2b heater
344a, 344b, 444a, 444b, 754a, 754b, 774a, 774b current source
430, 530, 630, 730, 760, 830, 860, 930, 960 quartz substrate
550, 650 base
552, 652 reinforcing plate
654 heat sink

The invention claimed is:

1. A Mach-Zehnder optical modulator of an optical waveguide type, comprising:
   a heater provided on at least one of first arm waveguides made of a non-electro-optic material; and
   electrodes provided on second arm waveguides made of an electro-optic material having an electro-optic effect, the second arm waveguides being optically connected to the first arm waveguides,
   wherein the heater is configured to set an operating point of the optical modulator by adjusting a phase of at least one of the first arm waveguides, and the electrodes are configured to apply a modulating signal for the optical modulator,
   wherein a substrate of the non-electro-optic material and a substrate of the electro-optic material are joined with an adhesive agent having a lower thermal conductivity than that of the substrate of the electro-optic material.

2. The optical modulator according to claim 1 wherein a substrate of the non-electro-optic material is a quartz-based substrate.

3. The optical modulator according to claim 1, comprising:
   a first substrate of the non-electro-optic material having a branching portion of the optical modulator formed therein; and
   a second substrate of the non-electro-optic material having a combining portion of the optical modulator formed therein,
   wherein the heater is formed on at least one of the first and second substrate.

4. The optical modulator according to claim 1, comprising more than one Mach-Zehnder interferometers.

5. The optical modulator according to claim 1, wherein a substrate of the non-electro-optic material and a substrate of the electro-optic material are joined by using a reinforcing plate having a lower thermal conductivity than that of the substrate of the electro-optic material.

6. The optical modulator according to claim 1, wherein only a substrate of the electro-optic material is fixed to a base.

7. The optical modulator according to claim 1, wherein a heat sink is provided to a substrate of the non-electro-optic material on which the heater is formed.

8. A Mach-Zehnder optical modulator of an optical waveguide type, comprising:
   a heater provided on at least one of first arm waveguides made of a non-electro-optic material; and
   electrodes provided on second arm waveguides made of an electro-optic material having an electro-optic effect, the second arm waveguides being optically connected to the first arm waveguides,
   wherein the heater is configured to set an operating point of the optical modulator by adjusting a phase of at least one of the first arm waveguides, and the electrodes are configured to apply a modulating signal for the optical modulator,
   wherein a substrate of the non-electro-optic material and a substrate of the electro-optic material are joined by using a reinforcing plate having a lower thermal conductivity than that of the substrate of the electro-optic material.

9. The optical modulator according to claim 8 wherein a substrate of the non-electro-optic material is a quartz-based substrate.

10. The optical modulator according to claim 8, comprising:
    a first substrate of the non-electro-optic material having a branching portion of the optical modulator formed therein; and
    a second substrate of the non-electro-optic material having a combining portion of the optical modulator formed therein,
    wherein the heater is formed on at least one of the first and second substrate.

11. The optical modulator according to claim 8, comprising more than one Mach-Zehnder interferometers.

12. The optical modulator according to claim 8, wherein only a substrate of the electro-optic material is fixed to a base.

* * * * *